Nov. 17, 1925.

R. C. RATHWELL 1,561,664

BREAD RACKING MACHINE

Filed July 13, 1925   10 Sheets-Sheet 1

INVENTOR
Robert Curtis Rathwell
BY S. E. Thomas
ATTORNEY.

Nov. 17, 1925.

R. C. RATHWELL 1,561,664

BREAD RACKING MACHINE

Filed July 13, 1925    10 Sheets-Sheet 3

INVENTOR.
Robert Curtis Rathwell
BY
S. E. Thomas
ATTORNEY.

Nov. 17, 1925.
R. C. RATHWELL
1,561,664
BREAD RACKING MACHINE
Filed July 13, 1925    10 Sheets-Sheet 4
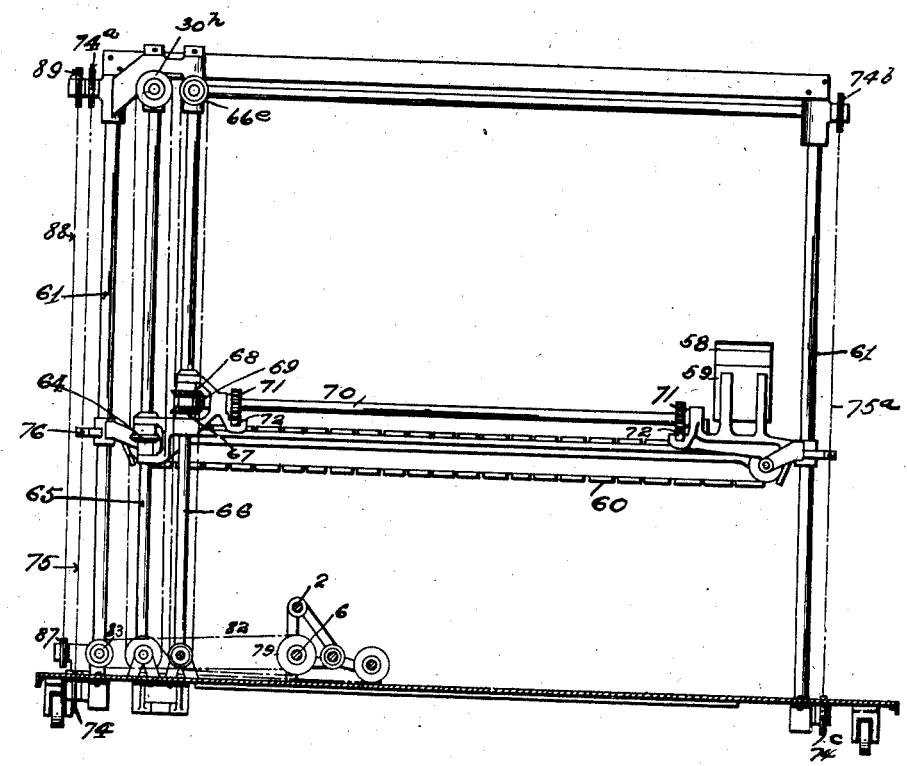
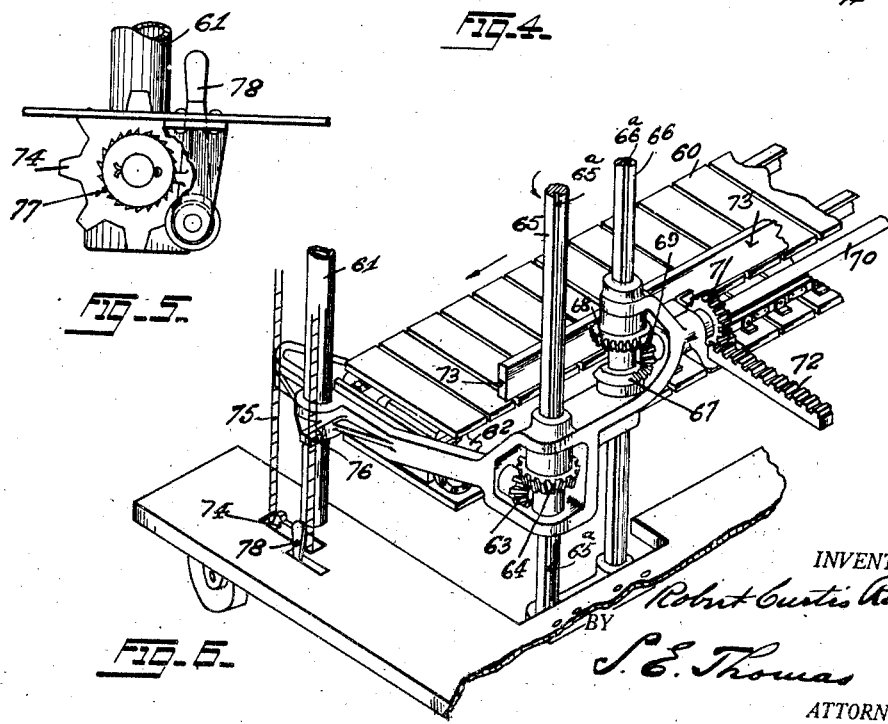
INVENTOR.
Robert Curtis Rathwell
BY
S. E. Thomas
ATTORNEY.

Nov. 17, 1925.  1,561,664

R. C. RATHWELL

BREAD RACKING MACHINE

Filed July 13, 1925   10 Sheets-Sheet 5

INVENTOR.
Robert Curtis Rathwell
BY
S. E. Thomas
ATTORNEY.

Nov. 17, 1925.　　　　　　　　　　　　　　　　　　1,561,664
R. C. RATHWELL
BREAD RACKING MACHINE
Filed July 13, 1925　　　10 Sheets-Sheet 6
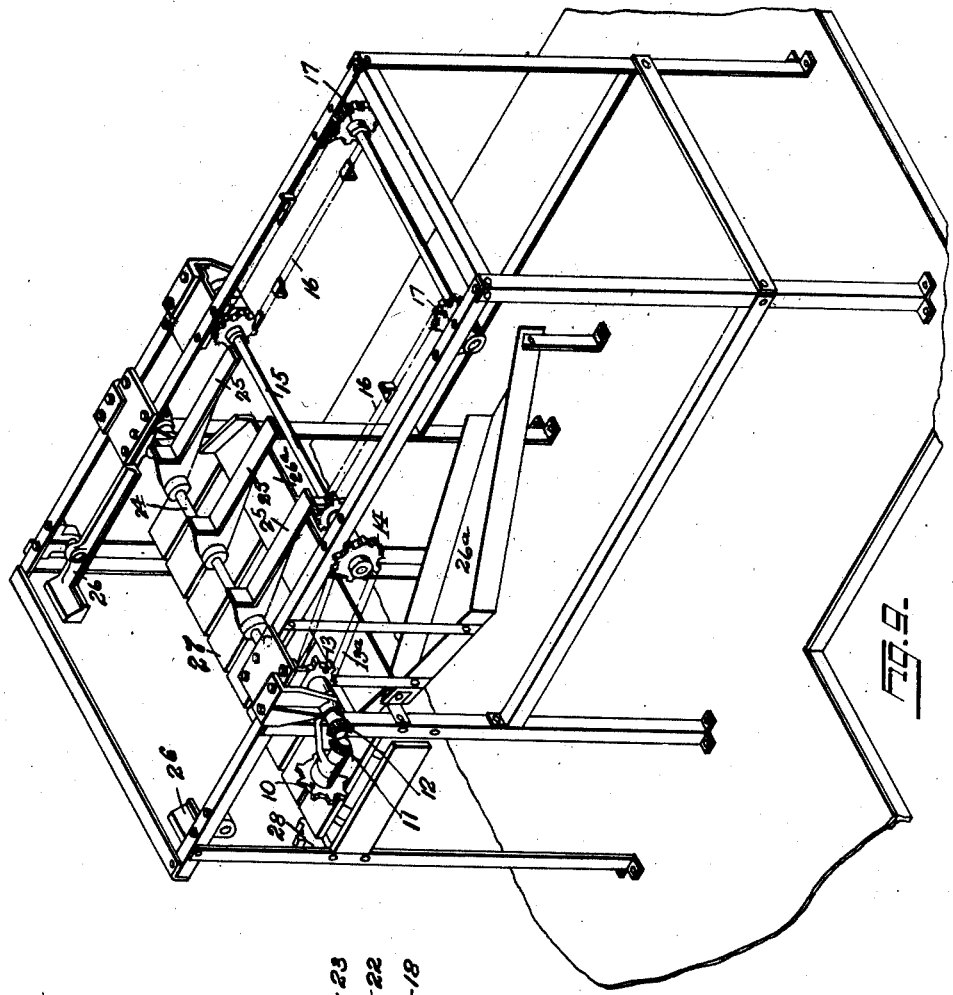
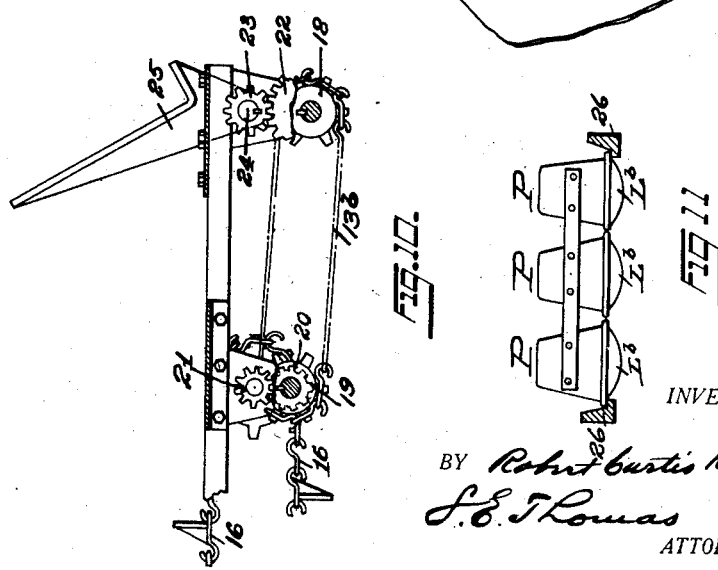
INVENTOR.
BY Robert Curtis Rathwell
S. E. Thomas
ATTORNEY.

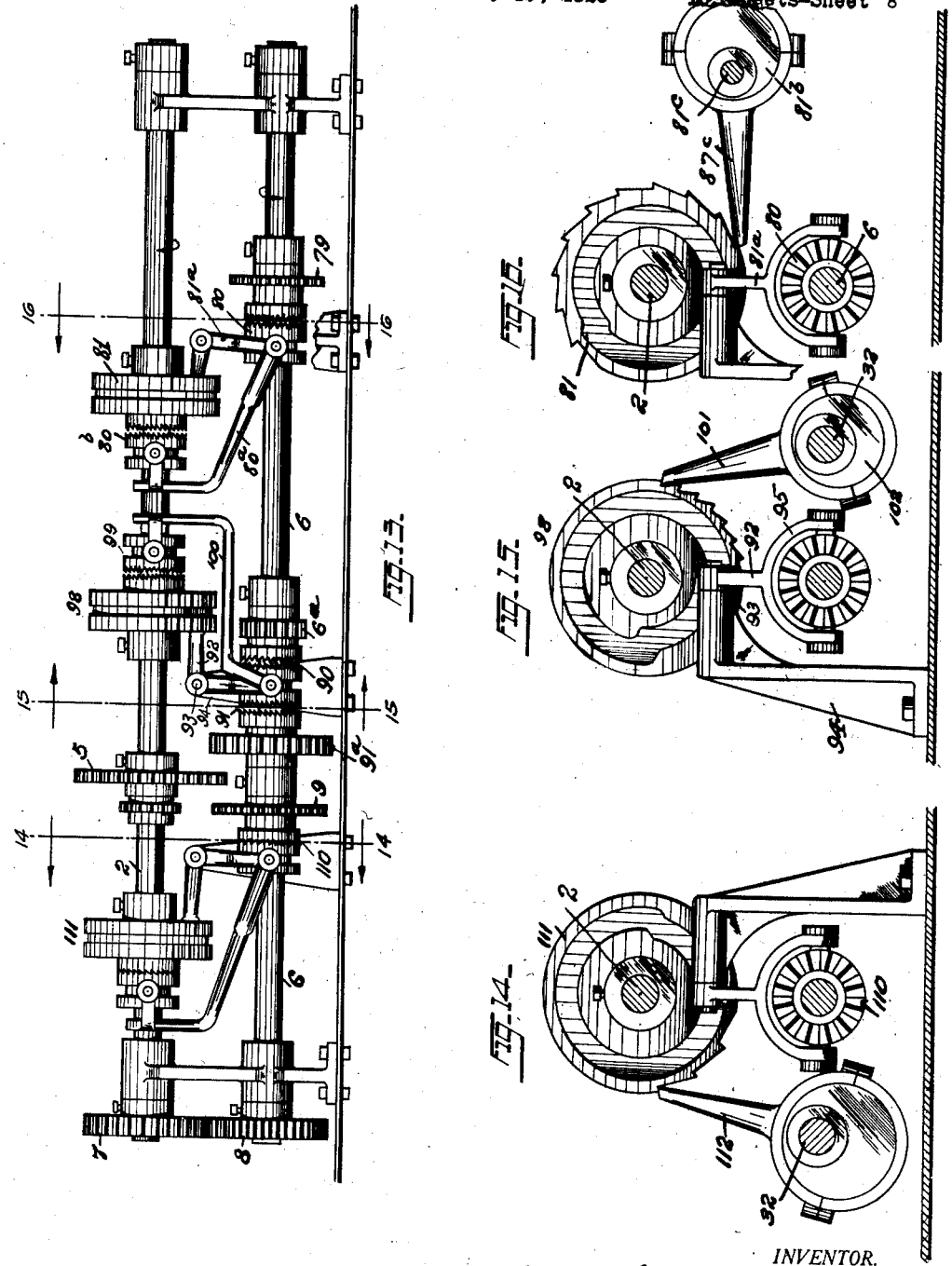

Nov. 17, 1925.
R. C. RATHWELL
BREAD RACKING MACHINE
Filed July 13, 1925     10 Sheets-Sheet 9
1,561,664
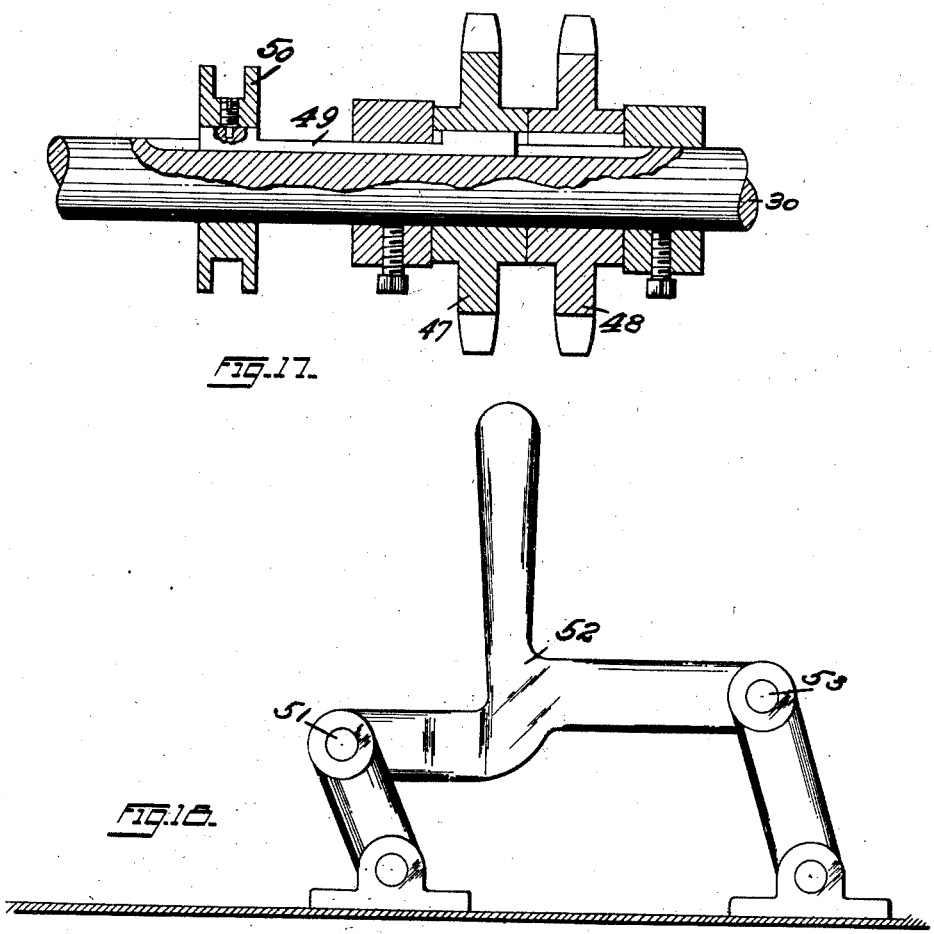
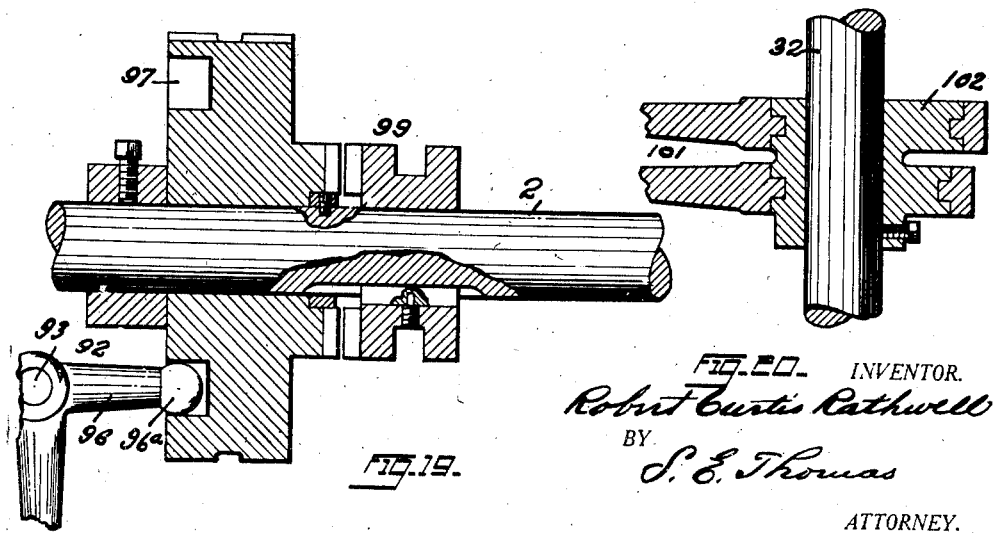
INVENTOR.
Robert Curtis Rathwell
BY
S. E. Thomas
ATTORNEY.

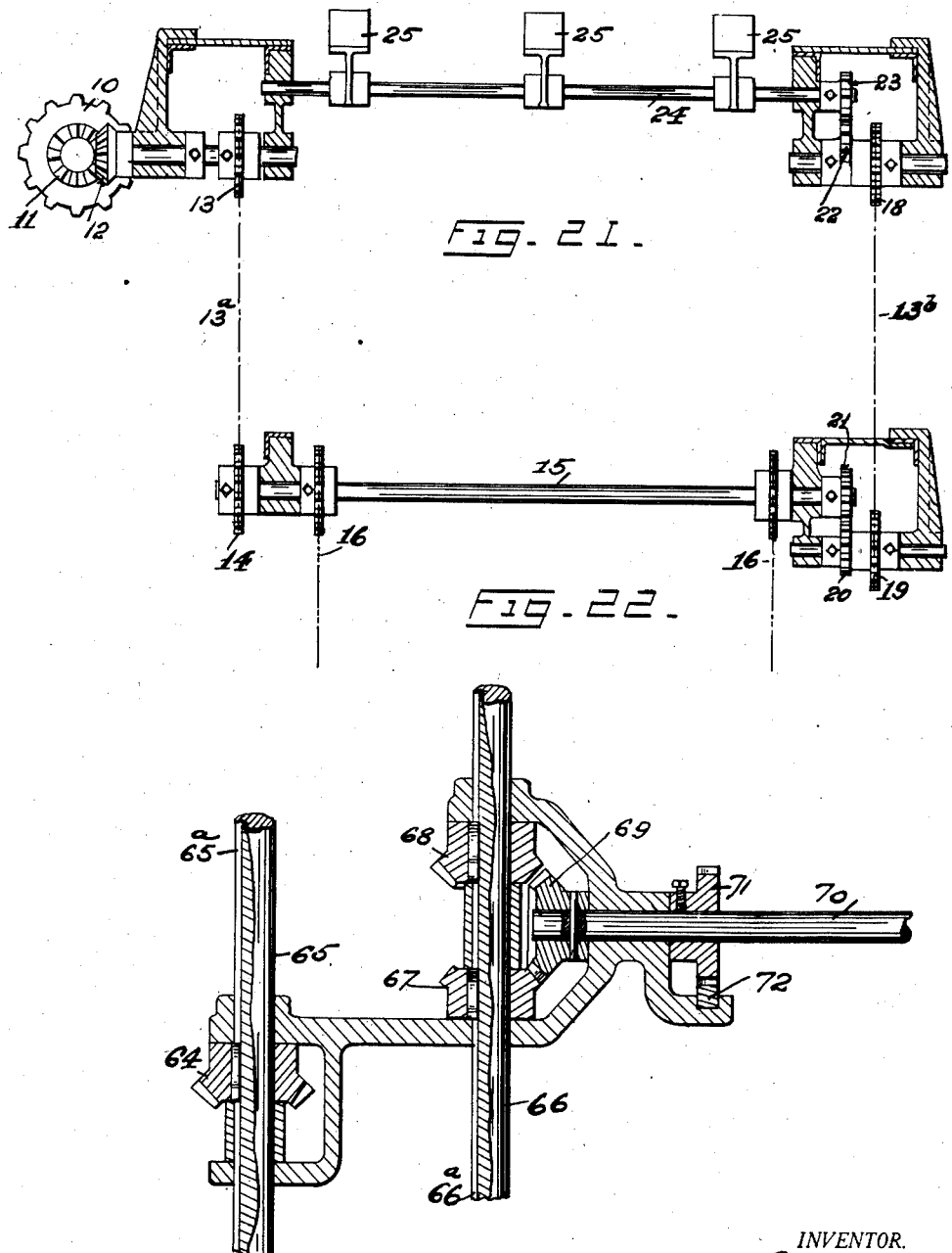

Patented Nov. 17, 1925.

1,561,664

UNITED STATES PATENT OFFICE.

ROBERT CURTIS RATHWELL, OF STRATHROY, ONTARIO, CANADA.

BREAD-RACKING MACHINE.

Application filed July 13, 1925. Serial No. 43,376.

*To all whom it may concern:*

Be it known that I, ROBERT CURTIS RATH-WELL, a British subject, residing at Strathroy, county of Middlesex, Province of Ontario, Canada, have invented a certain new and useful Improvement in Bread-Racking Machines, and declare the following to be a full, clear, and exact description of the same, such as will enable others skilled in the art to which it pertains to make and use the same, reference being had to the accompanying drawings, which form a part of this specification.

This invention relates to a machine for racking bread, shown in the accompanying drawings and more particularly described in the following specification and claims.

The primary object of the invention is to provide a machine adapted to receive pans of bread as rapidly as they may be taken from the oven and to convey the loaves—following their automatic removal from the pans—to a portable racking frame having a plurality of shelves—the machine being capable of adjustment from time to time whereby the several shelves may be loaded with bread until the entire racking frame is filled—it being unnecessary for the operator to handle or touch the loaves—thereby insuring the sanitary racking of bread immediately following its delivery from the oven.

Another feature of the invention consists in the means employed to dispose of the pans immediately following the removal of the bread therefrom.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 4 is a diagrammatic sectional elevation taken on or about line 4—4 of Figure 1, showing the driving shaft and mechanism for operating the pusher bar.

Figure 5 is a detail showing means for controlling the altitude of the horizontal vertically adjustable conveyor from which the bread is forced by the pusher bar onto the racking shelves.

Figure 6 is a fragmentary perspective view showing the vertically adjustable horizontal conveyor and pusher bar actuated by a pair of movable rack bars—one of which is shown.

Figure 9 is a perspective view of a fragment of the machine showing the conveyor for delivering the pans of bread as they are received from the oven upon a plurality of L-shaped rocking arms which invert the pans upon a pair of weighted tilting arms located directly above a second conveyor that in turn receives the loaves of bread as they drop from the pan:—the view also shows the chute which receives the inverted pan as it slides from the weighted tilting arms to convey it to the bottom of the machine, out of the way of the next pan of bread delivered thereto.

Figure 1:
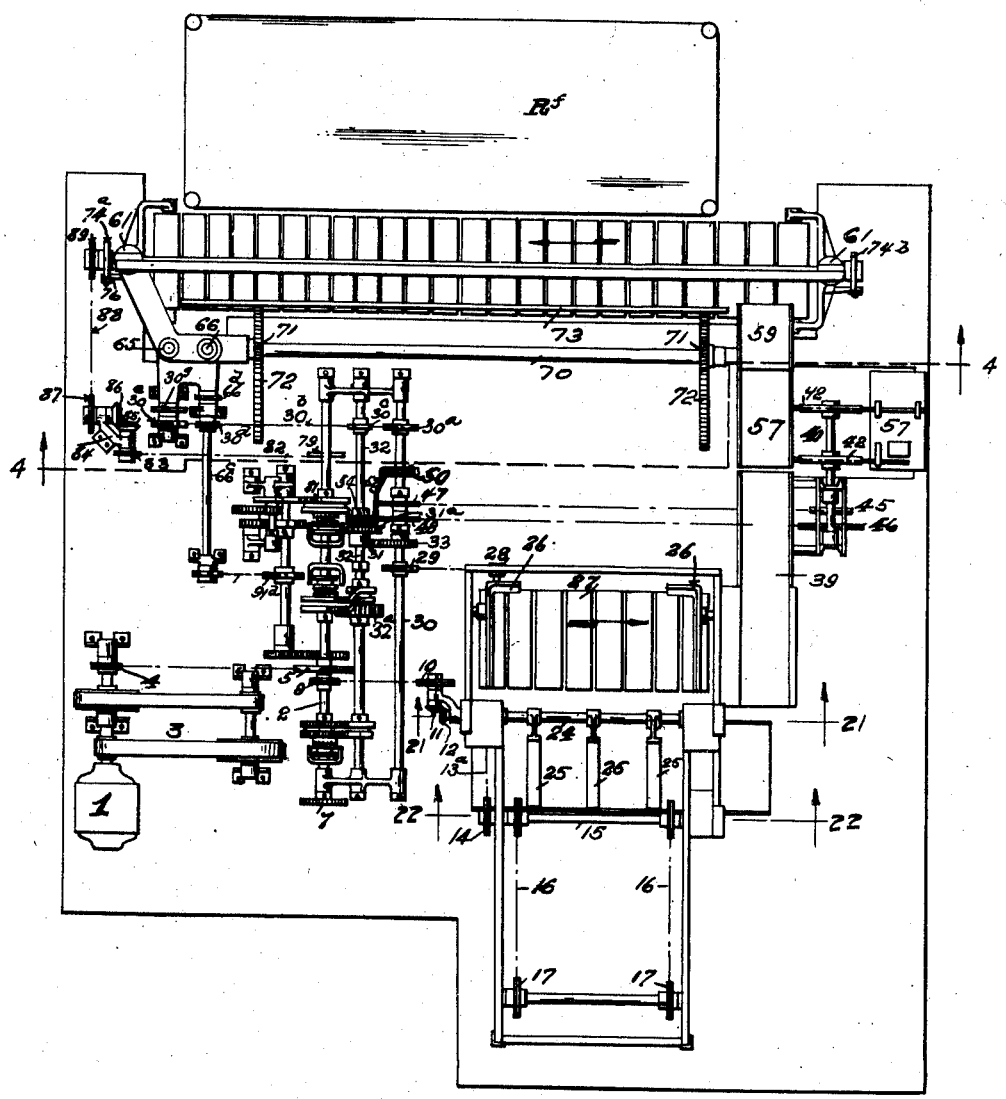
Figure 1 is a diagrammatic plan view of the machine located adjacent to a portable bread racking frame—upon the shelves of which loaves of bread are delivered by the machine.

Figure 10 is a detail view of the rocking arms which receive and invert the pan of bread—also a fragment of the sector operating the same taken on or about line 10—10 of Figures 1, 21 and 22.

Figure 11 is a detail view showing three bread pans, coupled together as a unit, in an inverted position upon the weighted tilting arms—shown in cross-section—which receives the pan and when tilted directs it onto a slide leading to the bottom of the machine.

Figure 12:
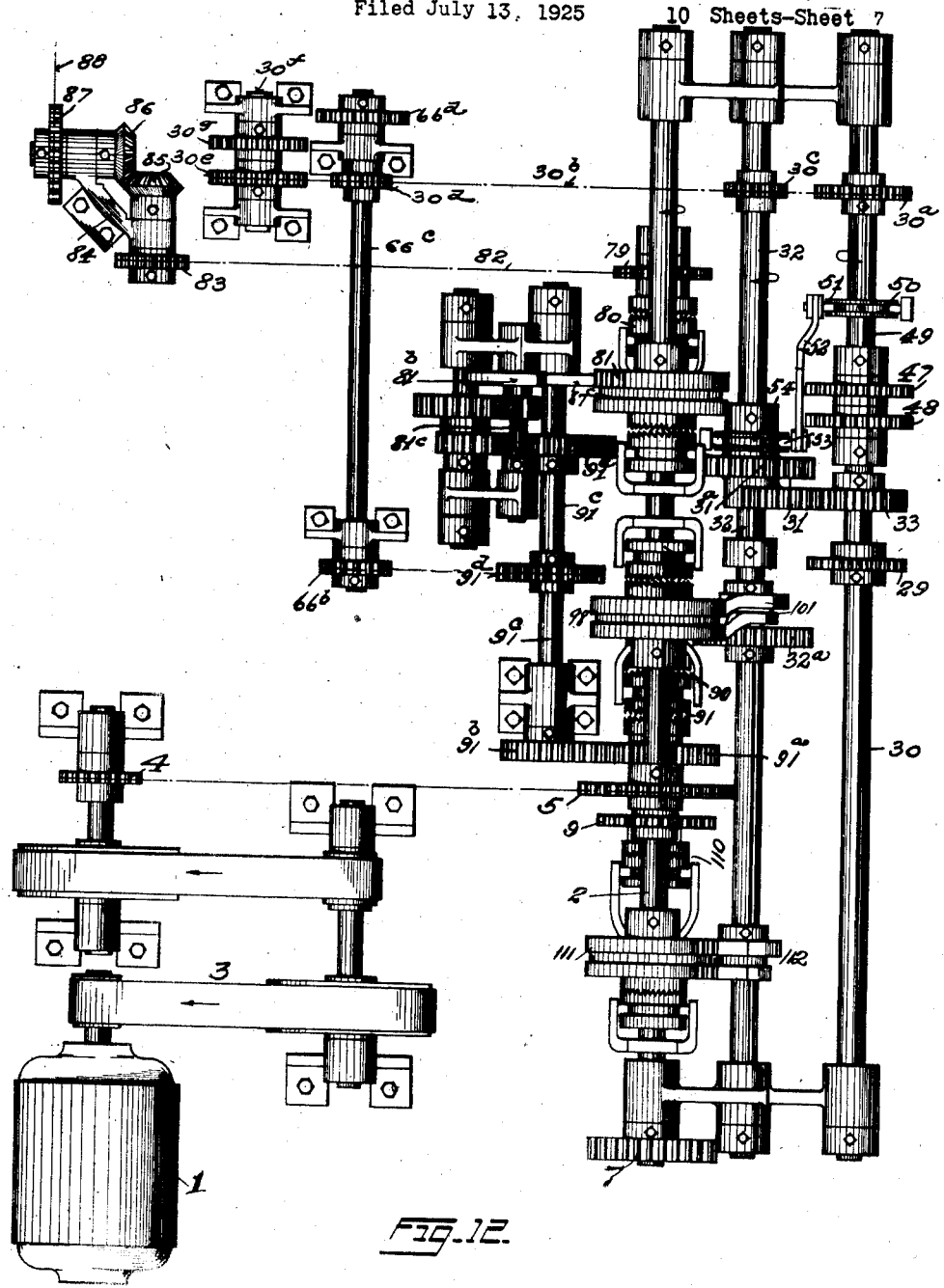

Figure 12 is a diagrammatic plan view—on a relatively larger scale than indicated in Figure 1—of the various controlling mechanism governing the operation of the several parts of the machine, also an electric motor or other prime mover and a speed reducing driving connection between the motor and machine.

Figure 13 is a side elevation also diagrammatic in character showing the several clutch mechanisms controlling the respective operations of the machine.

Figure 14 is a cross-sectional view through a clutch and cam mechanism, taken on or about line 14—14 of Figure 13, controlling the conveyor delivering the pans of bread to the L-shaped rocking arms.

Figure 15 is a detail cross-sectional view of a cam and clutch mechanism taken on or about line 15—15 of Figure 13.

Figure 16 is a detail cross-sectional view of a cam and clutch mechanism taken on or about line 16—16 of Figure 13.

Figure 17 is a fragmentary detail view partly in section showing a slidable key for alternately locking adjacent sprocket wheels to the driving shaft controlling the operation of the elevator.

Figure 18 is an elevation of a handle for manually shifting the slidable key shown in Figure 17 and also indicated in Figure 12 of the drawing.

Figure 19 is a fragmentary cross-sectional view of one clutch mechanism—which is typical of the others employed.

Figure 20 is a fragmentary detail sectional view through an eccentric controlling the operation of the dogs engaging a ratchet cam—see Figure 14.

Figure 21 is a vertical cross-sectional view of a detail of construction taken on or about line 21—21 of Figure 1, showing a pinion keyed to the shaft of the L-shaped rocker arms actuated by a sector secured to a sprocket wheel shaft of the pan conveyor.

Figure 22 is a similar vertical cross-sectional view taken on or about line 22—22 of Figure 1—indicating diagrammatically the driving chain connection between the sprocket wheels of Figure 21 and Figure 22—showing also diagrammatically a fragment of the pan conveyor chain carried by sprocket wheels keyed to a shaft of the pan conveyor.

Figure 23 is a vertical cross-sectional view taken through the bevel gearing slidable upon the respective vertical shafts controlling the pusher bar and the horizontal loaf conveyor with which the pusher bar co-ordinates.

The construction and operation of the machine, will now be more particularly pointed out and explained, like reference characters being used to indicate the same parts throughout the various figures of the drawings.

The prime mover 1 is operably connected with the driving shaft 2 through a suitable speed reducing mechanism 3 fitted with a driving sprocket wheel 4 connected by a driving chain with a sprocket wheel 5 keyed to the shaft 2—which in turn actuates a shaft 6 below, through intermeshing gears 7 and 8 keyed to the ends of the respective shafts—see Figures 12 and 13.

Mounted upon the shaft 6 is a sprocket wheel 9 connected by a driving chain with a wheel 10 mounted on a stub shaft fitted with a beveled gear 11 adapted to drive a gear 12 secured to a stub shaft on which is mounted a sprocket wheel 13 designed to drive through a chain 13$^a$, a sprocket 14 on the shaft 15 of the chain conveyor 16—see Figures 1, 9 and 22.

The chain conveyor 16 is carried by sprocket wheels 17—17 respectively mounted on the ends of a shaft journalled in the frame of the machine at the forward end of the conveyor.

Aligned with the stub shaft carrying the sprocket wheel 13, is a like stub shaft on the opposite side of the machine on which is mounted a sprocket wheel 18 driven by a sprocket chain 13$^b$ from a sprocket wheel 19 on a stub shaft fitted with a pinion 20 in mesh with a pinion 21 on the shaft 15—see Figures 21 and 22.

Mounted on the stub shaft adjacent the sprocket gear 18, is a segmental gear 22 in mesh with a pinion 23 secured on the end of a rock shaft 24—fitted with a plurality of L-shaped rocker arms 25—see Figures 9, 10 and 21.

Pivoted respectively to the opposite sides of the frame are a pair of weighted arms 26, 26, and directly beneath said arms is a transversely movable conveyor 27 driven by a sprocket wheel 28 on the end of one of the conveyor shafts—connected by a sprocket chain with the sprocket wheel 29 on the shaft 30; actuated by a sector 31 on the shaft 32 in mesh with a gear 33 on the shaft 30. The shaft 32 is driven by a gear 32$^a$ meshing with a gear 6$^a$ on the shaft 6.

The chain conveyor 16 receives the pans of bread from the operator as they come from the oven and delivers them upon the L-shaped rocker arms 25 which being rocked by segmental gear 22 inverts the pan P onto the pivoted weighted arms 26, whereupon the L-shaped rocker arms—being momentarily released from control of the segmental gear—return to their initial position until rocked again by the rotation of said gear.

Figure 2:
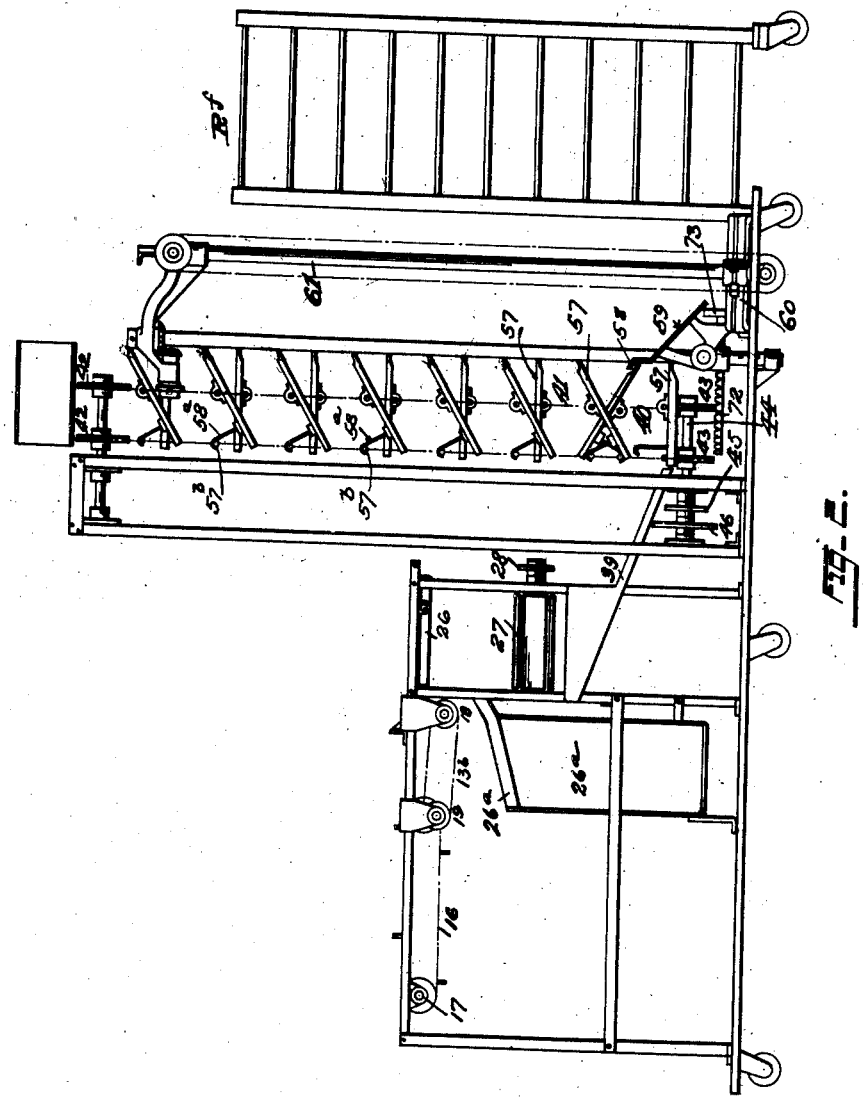
Figure 2 is a diagrammatic end elevation of the machine and racking frame, shown in the preceding figure.
Figure 3:
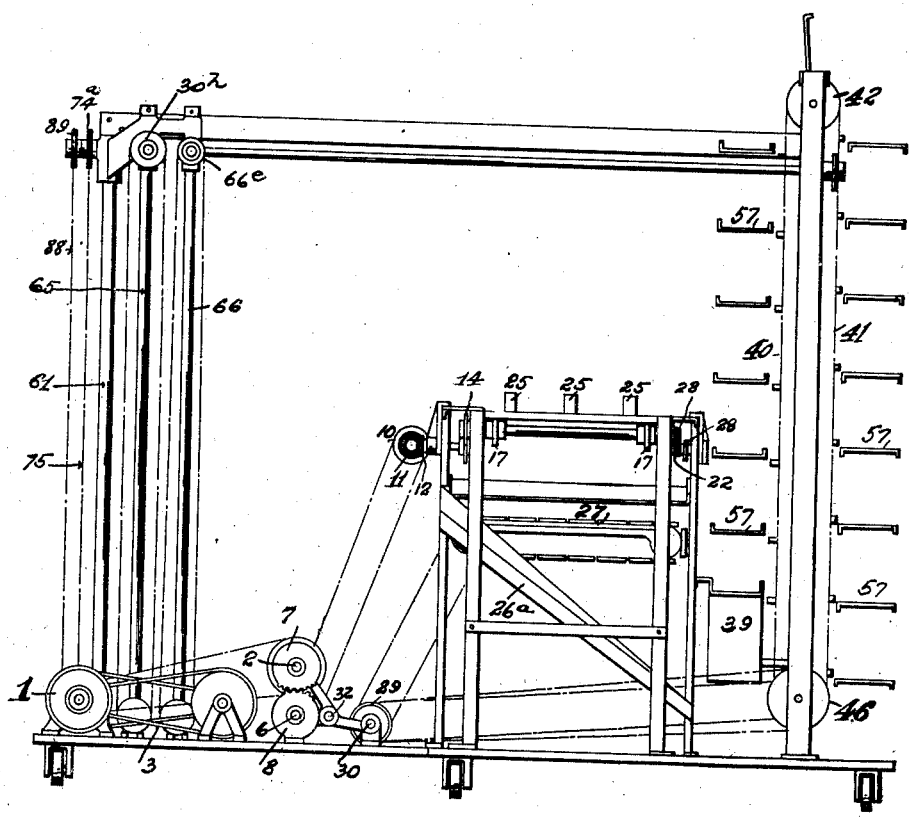
Figure 3 is a diagrammatic side elevation of the machine.
Figure 7:
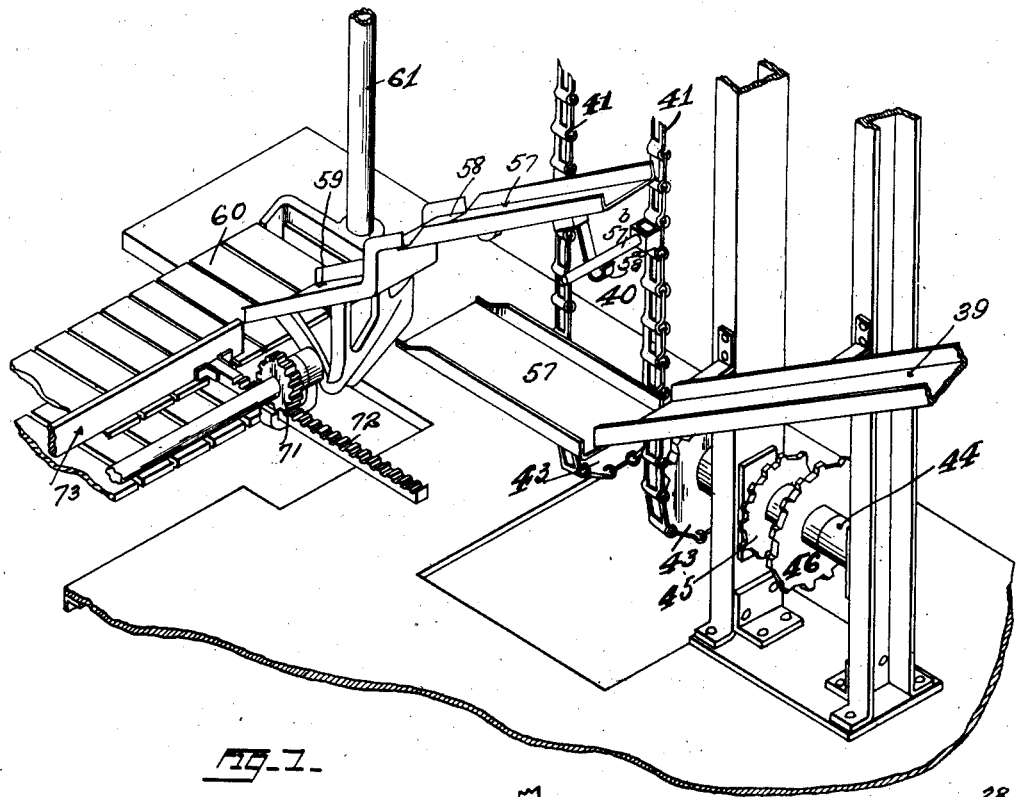
Figure 7 is a fragmentary perspective view showing the elevator whereby the bread delivered from an inclined chute is conveyed to the horizontal vertically adjustable conveyor from which it is forced upon the shelves of the racking frame.
Figure 8:
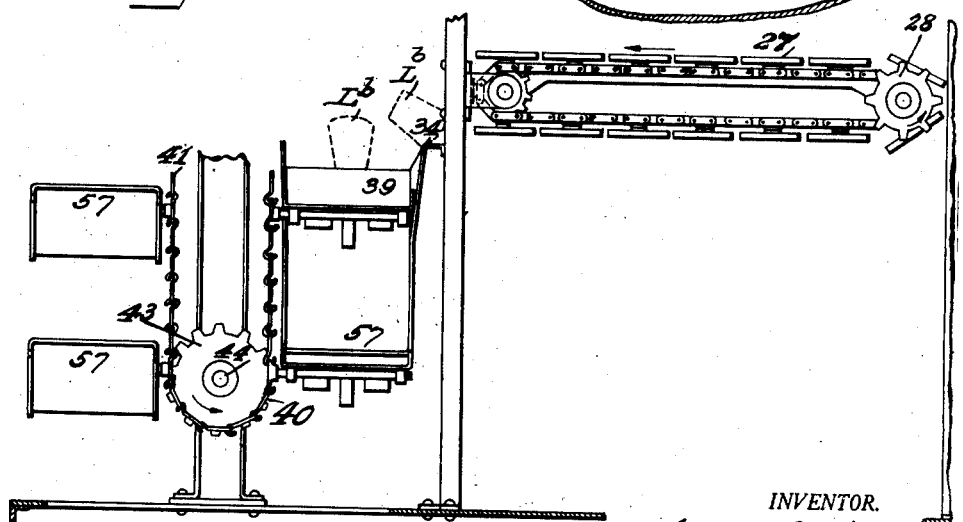
Figure 8 is a fragmentary end elevation of the chain elevator and also the conveyor by which the bread is conducted while in an inverted position to a tripping means which reverses the bread that it may slide "right side up" down a chute onto the tilting blades of the elevator.

The bread L$^b$ drops from the inverted pan onto the conveyor 27 which conducts the loaves while inverted toward an obstruction or ledge 34—see Figure 8—which forces the loaves to roll over—"right side up"—onto a chute 39—see Figures 1, 2, and 8—leading to an elevator 40 consisting of a pair of sprocket chains 41 carried by wheels 42 on a shaft at the top of the machine and at the bottom by sprocket wheels 43 on a shaft 44 on which are mounted two sprocket wheels 45 and 46—see Figures 1 and 7—connected by a chain drive with sprocket wheels 47 and 48 alternately keyed to the shaft 30—see Figure 1 and 12—by a slidable key 49 fitted with a grooved collar 50 into which extends a pin 51 on the arm of a shifting device 52, by manually operating which the sprocket wheels 47 and 48 may be alternately keyed to the shaft 30.

The shifting device 52 has also a pin 53 extending into a grooved collar 54 adapted to simultaneously shift the sectors 31 and 31ª on the shaft 32 that they may alternately mesh with gear 33 on the shaft 30—the purpose of which will hereafter be explained.

The loaves of bread slide from the chute 39 onto a plurality of tiltable plates or flights 57 weighted at one end and pivoted to the elevator 40 and as the elevator ascends the flights are tripped by an abutment 58 on the end of an inclined channel way 59 supported by the frame of a horizontal conveyor 60, that the loaves may slide onto the conveyor 60—the frame of which is vertically slidable on a pair of posts 61, 61—see Figures 1, 2 and 7.

The flights 57 are provided with short hooks 57ª on their underside to engage pins 57ᵇ carried by the chain to limit the tilting action of the flights when moving in a downward direction that they may properly function to engage the "tripping" means 58 when ascending.

The conveyor 60 is moved horizontally in a step by step manner by a sprocket wheel drive 62 mounted on a shaft driven by a beveled gear 63 in turn carried by a shaft journalled in the bracket frame of the conveyor—see Figures 4 and 6. The beveled gear 63 meshes with a gear 64, keyed to and slidable upon a vertical shaft 65, having a longitudinal groove 65ª in which the key of the gear slides.

Keyed to the shaft 30—see Figure 12—is a sprocket wheel 30ª fitted with driving chain 30ᵇ, passing over idler 30ᶜ on shaft 32 and idler 30ᵈ on shaft 66ᶜ, drives sprocket wheel 30ᵉ on shaft 30ᶠ fitted with sprocket wheel 30ᵍ having chain driving connection with sprocket wheel 30ʰ—see Figure 4—driving vertical shaft 65, whereby conveyor 60 is operated.

Parallel with the upright shaft 65 and extending through the vertically movable frame of the horizontal conveyor 60 is a shaft 66 having a longitudinal groove 66ª throughout its length to receive the keys of a pair of mutilated gears 67, 68, in mesh with a beveled gear 69 mounted on the end of a transverse shaft 70 fitted with a pair of pinions 71, 71, in mesh with rack bars 72, 72, attached at their forward ends to a pusher bar 73 adapted to force the loaves of bread Lᵇ from the conveyor onto the respective shelves of a portable racking frame R' when the conveyor is vertically raised in alignment with the shelves of the latter. The mutilated gears 67, 68, providing a forward and backward movement of the pusher bar through their alternate driving connection with the beveled gear 69 carried by the shaft 70, to which is secured the pinions 71 in mesh with the rack bars 72, and whereby the pusher bar is actuated in a forward and reverse direction.

To adjust the altitude of the conveyor 60 upon a plane with the several shelves of the portable racking frame, a sprocket wheel 74 is journalled in the frame of the machine and fitted with a chain 75 traveling over a sprocket wheel 74ª at the top of the machine —the chain being secured at 76 to the conveyor frame and when driven by sprocket chain 88 passing over sprocket 89 raises the conveyor 60 in alignment with the several shelves of the racking frame. The conveyor 60 is also attached at its opposite end to a sprocket chain 75ª travelling over sprocket wheels 74ᵇ at the top and over sprocket wheel 74ᶜ at the base of the machine—see Figure 4.

The conveyor 60 is raised through a driving sprocket 79,—loosely mounted on a shaft 6 adapted to be locked in driving relation with the shaft by a clutch 80, actuated by a controlling cam 81 mounted on the shaft 2, see Figures 1, 12, 13 and 16 :—connected by a sprocket chain 82 with the sprocket gear 83 mounted on a stub shaft journaled in a bracket 84 of the frame.

Secured to the stub shaft of the sprocket wheel 83 is a beveled gear 85 in mesh with a gear 86 mounted on a stub shaft fitted with a sprocket wheel 87 having a chain drive connection 88 with a sprocket wheel 89 keyed to the shaft of the sprocket wheel 74ª carrying the chain 75 for elevating the conveyor 60—see Figures 4, 6 and 12.

Mounted on the shaft of the sprocket wheel 74 is a ratchet wheel 77 engaged by a spring actuated pawl carried by a manually operated releasing lever 78—graphically indicated in Figures 5 and 6—for releasing the conveyor when raised to its highest altitude that it may descend by gravity to its initial or lowermost position to be again raised in alignment with the respective shelves of the racking frame by the operation of the driving mechanism.

Referring again to the sprocket wheel 79 loosely mounted on the shaft 6—see Figures 13 and 16—is a clutch 80 for locking the sprocket wheel 79 to the shaft, the slidable member of the clutch is operated through a controlling cam 81 co-operating with a bell-crank lever 81$^a$—one arm of which traverses a cam groove in the member 81, see Figures 13, 16 and 19—while the other arm of the bell-crank lever is pivoted to an arm 80$^a$ connected with a slidable ratchet clutch member 80$^b$, on the shaft 2, adapted to engage a co-operating ratchet forming part of the controlling cam 81.

An eccentric 81$^b$, carried by shaft 81$^c$ forming part of train of gears driven by gear 91$^e$ on shaft 91$^c$ to "step up" the speed of the parts operated thereby—see Figure 12—actuates an arm 87$^c$ engaging the ratchet teeth of cam 81, thereby rotating the latter with its cam way controlling the bell-crank lever 81$^a$, thereby operating clutch 80 as described.

Conveyor 27 receives the loaves of bread as they drop from the pan moving forward step by step the width of a loaf—the motion being controlled by sectors 31, 31$^a$, on shaft 32 and is adjusted for different size loaves by manually shifting the handle of the controlling device 52 to alternately engage the respective sectors 31, 31$^a$, with the gear 33, on shaft 30. Conveyor 27 being operated through gear 28, driven by sprocket chain from gear 29 on shaft 30, is therefore actuated by same sector as that operating conveyor 16.

The elevator 40 is also operated from this device and has a gear shift—see sprocket wheels 47 and 48 in Figure 12, alternately keyed to the shaft 30 by the slidable key 49—previously described.

When conveyor 60 is filled with loaves of bread a clutch 90—see Fig. 13—is disengaged. This stops the motion of the conveyors 27, 60 and elevator 40. Clutch 91 when engaged controls the gears operating the pusher bar 73 which forces the loaves of bread from the conveyor 60 onto the shelves of the racking frame R$^f$, whereupon the pusher bar returns to its initial position through the action of mutilated gears 67, 68. Clutch 91 is then disengaged and clutch 90 engaged, thereby starting in motion the elevator and conveyors.

Clutch 91 when engaged locks gear 91$^a$ to the shaft 6. Gear 91$^a$ drives gear 91$^b$ keyed to shaft 91$^c$—see Figures 12 and 13.

Keyed to shaft 91$^c$ is a sprocket gear 91$^d$ having a chain drive connection with gear 66$^b$ on shaft 66$^c$ on which is mounted a sprocket wheel 66$^d$ which in turn drives 66$^e$ and thereby actuates the shaft 66, which in turn as previously described operates the pusher bar 73.

The pusher bar is actuated twice in pushing the rows of bread onto the respective shelves of the racking frame. Clutch 80 is then engaged thereby operating the gears and chain hoists which raise the frame of the horizontal conveyor 60 to the next shelf or bread rack, whereupon the delivery of bread to the conveyor and its discharge upon the shelf of the racking frame is repeated.

When the bread rack has been filled in the manner described the conveyor 60 is released by manually operating the lever 78 whereupon the conveyor descends by gravity to its initial position and another racking frame is moved into position and filled as described.

The several operations of this machine are governed by a plurality of clutches 80, 90, 91, 110, mounted on shaft 6, controlled by cams and clutches mounted on shaft 2 above—the several cams being operated a predetermined degree by eccentric arms adapted to engage a limited number of ratchet teeth provided in the rim of the cam member.

The construction and operation of one of these devices being typical of the others it will be unnecessary to describe each in detail.

The clutches 90 and 91 are adapted to be engaged alternately. A bell crank rocker arm 92 is pivoted at 93 to a bracket 94 bolted to the frame. One of the arms of the bell crank is forked as at 95 and fitted with studs extending into a peripheral groove in the clutch to shift the latter.

The other arm 96 preferably terminates in a ball-shaped end 96$^a$—see Figures 15 and 19—adapted to traverse a cam-groove 97 in the member 98 loosely mounted on the shaft 2. Slidable on the shaft 2—see Figure 13—is a ratchet faced clutch key 99 adapted to engage the member 98. An arm 100 is pivoted at one end to the bell crank rocker arm 92 and at its opposite end is loosely connected with the ratchet clutch key 99. The cam is fitted with a limited number of ratchet teeth in two rows, the rows having a relatively different number of teeth either of which may be engaged as desired—in accordance with the degree of rotation required—by an arm 101 actuated by an eccentric 102 from the shaft 32—the eccentric arm shifting the controlling cam that the bell crank rocker arm may be actuated through the cam groove causing the rocker arm to tilt periodically to release one clutch and engage the other and to release or engage the slidable key on the shaft 2 to lock or release the controlling cam on the shaft as required.

Clutch 110 on shaft 6 controlled by cam clutch 111 on shaft 2 and eccentric arm 112 on shaft 32 actuating the arms engaging the teeth of the controlling cam 111, controls the operation of conveyor 16, delivering the pan P with the loaves to the tilting arms 25, inverted thereby onto the weighted arms 26, 26,—the bread dropping from the pans upon conveyor 27: the weighted arms 26, 26, tilting under the weight of the pan that it may slide down chutes 26ª, 26ª,—see Figures 2 and 9—to the floor for manual removal out of the way of the next pan of bread placed upon conveyor 16 from the oven.

The conveyor 27 carries the loaves of bread forward while still inverted and as they drop onto the ledge or obstruction 34—see Fig. 8—are thereby turned right side up on slide 39 which delivers them to the weighted tilting plates on flights 57 of elevator 40. The elevator flights as they ascend are tripped by an abutment 58 on an inclined channel 59 carried by the frame of the horizontal conveyor 60—which is adapted for vertical adjustment that it may be brought into alignment with the respective shelves of the racking frame.

Upon the conveyor 60 receiving its full quota of bread from the elevator the entire row is simultaneously pushed from the conveyor onto the shelf of the racking frame R¹, with which it may at the time be aligned, by the pusher bar 73, which then returns to its initial position through the action of the mutilated gears 67 and 68, alternately in mesh with the gear 69 controlling the forward and backward movement of the rack bars 72—72 secured to the pusher bar—as has been previously described.

Upon the conveyor being filled again with bread the pusher bar is actuated forcing the last row of loaves from the conveyor against the first row of the loaves on the racking frame—pushing the latter backwardly upon the shelf and thereby making room for the second row. The conveyor 60 is then raised to the next shelf of the racking frame whereupon the operation just described is repeated.

When all of the shelves of the racking frame are filled, the releasing lever 78— see Figures 5 and 6—is manually operated that the conveyor 60 may descend by gravity to its lowermost or initial position. The racking frame with its load of bread is then wheeled away to be replaced by another racking frame that bread may be loaded therein as described.

Having thus described my invention what I claim is:

1. In combination with a racking frame including a plurality of shelves; a machine of the class described comprising a conveyor adapted to receive and convey pans of bread as received from an oven; means for inverting the pans of bread delivered by the conveyor, whereby the bread may fall from the pans; a second conveyor adapted to receive the bread as it drops from the pans; an elevator for receiving the loaves of bread delivered by the second conveyor; a vertically adjustable horizontal conveyor adapted to receive the bread from the elevator and to travel in a step by step manner until the entire length of the conveyor is filled with bread; and means for pushing the row of bread from said last named conveyor onto the shelves of the racking frame.

2. In combination with a racking frame including a plurality of shelves; a machine of the class described comprising a conveyor adapted to convey pans of bread as received from an oven; means for inverting the pans of bread consisting of a rock-shaft fitted with a plurality of arms adapted to receive the pans delivered by the conveyor; means for actuating the rock shaft; weighted arms pivoted to the frame adapted to receive the inverted pans from the rocking arms and tiltable under the weight of the pan; a chute co-ordinating with the tilting arms for conducting the pan out of the way of pans subsequently inverted upon the tilting arms; a horizontal conveyor to receive the loaves of bread dropped from the pans; an elevator for receiving the loaves of bread from the horizontal conveyor; a vertically adjustable horizontal conveyor to receive the loaves of bread from the elevator adapted to travel in a step by step manner until the entire length of the conveyor is filled with bread before discharging the bread therefrom and means for pushing the row of bread from said last named conveyor onto the racking frame.

3. In combination with a racking frame including a plurality of shelves; a machine of the class described comprising a conveyor adapted to convey pans of bread as received from an oven; means for inverting the pans of bread delivered thereto by the conveyor, whereby the bread may fall from the inverted pans onto a conveyor; a horizontal conveyor adapted to receive the inverted bread from the pans; a slide for conducting the bread to an elevator; means for automatically turning the loaves "right side" up while being conducted from the conveyor to the elevator; an elevator for receiving the loaves of bread; a vertically adjustable horizontally movable conveyor adapted to receive the bread from the elevator and to travel in a step by step manner until the entire length of the conveyor is filled with bread delivered thereto by the elevator; and means for pushing the row of bread from said last named conveyor onto the racking frame.

4. In combination with a racking frame including a plurality of shelves, a machine of the class described including means for inverting pans of bread, whereby the loaves may drop from the pans, a conveyor adapted to receive and conduct the bread to an elevator, means for turning the loaves right side up prior to delivery to the elevator, an elevator fitted with a plurality of tiltable flights to receive the loaves; a longitudinal movable vertically adjustable conveyor provided with tripping means adapted to tilt the elevator flights as they ascend in contact therewith, whereby the loaves of bread may slide down the respective flights onto the horizontally movable vertically adjustable conveyor, means governing the horizontal movement of said conveyor in an intermittent step-by-step manner, whereby the loaves of bread may be deposited by the elevator flights side by side upon the conveyor until its total length is covered, and means for simultaneously pushing the entire row of bread onto the respective shelves of the racking frame.

5. In combination with a racking frame including a plurality of shelves, a machine of the class described including means for inverting pans of bread, whereby the loaves may drop from the pans, a conveyor adapted to receive and conduct the bread to an elevator, means for turning the loaves right side up prior to delivery to the elevator, an elevator fitted with a plurality of tiltable flights to receive the loaves, a horizontally movable vertically adjustable conveyor provided with tripping means adapted to tilt the elevator flights as they ascend in contact therewith, whereby the loaves of bread may slide down the respective flights onto the vertically adjustable horizontal conveyor, means governing the movement of said conveyor in an intermittent step by step manner, whereby the loaves of bread may be deposited by the elevator flights side by side upon the conveyor until its total length is covered, and means for automatically pushing said row of loaves from the conveyor onto one of the shelves of the racking frame and to return said pushing means to its initial position, whereby when again actuated the succeeding row of loaves pushed from the conveyor will through contact with the row of loaves previously delivered to the racking frame force the latter backwardly upon the shelves making room for the row of loaves last delivered.

6. In combination with a racking frame including a plurality of shelves; a machine of the class described including means for inverting pans of bread, whereby the loaves may drop while inverted upon a conveyor, a conveyor, a slide adapted to receive the loaves from the conveyor provided with an abutment adapted to cause the bread to roll over right side up for delivery to an elevator, the elevator being fitted with a plurality of tiltable flights adapted to receive the loaves of bread, whereby they may be elevated to the plane of a horizontal conveyor adjustable to the altitude of the shelves of the racking frame, a horizontally movable, vertically adjustable conveyor fitted with means for tripping the elevator flights as they respectively contact when raised in alignment therewith, means adapted to govern the progress of said last named conveyor in an intermittent step-by-step manner and for intermittently elevating the same in alignment with the respective shelves of the racking frame, and pushing means for simultaneously forcing an entire row of loaves from the conveyor onto the racking frame and for automatically returning the pushing means to its initial position.

7. In a machine of the character described; including a conveyor for receiving pans of bread, a rock shaft fitted with a plurality of L-shaped rocking arms adapted to receive the pans of bread from the conveyor, weighted arms pivoted to the frame of the machine; a pinion fitted to the rock shaft, a segmental gear in mesh with the pinion adapted to intermittently tilt the rocking arms whereby the pans may be inverted upon the weighted pivoted arms, the L-shaped rocking arms being adapted to return by gravity to their initial position when released from the control of the segmental gear upon further rotation of the latter, and a chute adapted to receive and remove the inverted pans from the weighted arms upon the latter tilting under the weight of the pans.

8. In a machine of the character described, including a horizontal conveyor belt adapted to be progressively elevated step by step in alignment with the respective shelves of a racking frame; means for actuating the conveyor in a horizontal direction, including a driving gear; a vertical shaft having a longitudinal peripheral groove; a gear in mesh with the driving gear keyed to said shaft and slidable throughout its length; sprocket wheels suitably journaled fitted with a chain attached to the conveyor frame; means for intermittently actuating the sprocket wheel, whereby the conveyor may be raised in alignment with the several shelves of a racking frame, and means for releasing said conveyor when fully raised, from operative connection with said elevating means, whereby the conveyor may descend by gravity to its lower initial position.

9. In a machine of the character described, including a vertically adjustable horizontally movable conveyor belt, means for raising said horizontal conveyor in a step by step manner whereby it may be progressively aligned with the several shelves of a racking frame, means adapted to move said belt horizontally in a step by step manner while receiving loaves of bread progressively delivered thereto until covered by a row of loaves located adjacent to each other; means for simultaneously pushing the row of loaves from the horizontal conveyor onto the respective shelves of a racking frame, comprising a pusher bar adapted to bear simultaneously against all of the loaves; rack bars secured to the pusher bar; a shaft suitably journaled fitted with pinions in mesh with the rack bars; a gear mounted on the end of said shaft; a vertical shaft having a longitudinal groove throughout its length: a pair of mutilated gears slidable upon said shaft and keyed thereto—the teeth of the respective gears being adapted to alternately mesh with the gear on the end of said first named shaft, whereby the pusher bar may be driven forward and then returned to its initial position following the discharge of the bread upon shelves of the racking frame and means for actuating said vertical shaft.

10. In combination with a racking frame including a plurality of shelves; a machine of the class described comprising a conveyor adapted to receive and convey pans of bread as received from an oven; means for inverting the pans of bread delivered by the conveyor, whereby the bread may fall from the pans; a second conveyor adapted to receive the bread as it drops from the pans; an elevator for receiving the loaves of bread delivered by the second conveyor; a vertically adjustable horizontal conveyor adapted to receive the bread from the elevator and to travel in a step by step manner until the entire length of the conveyor is filled with bread; a prime mover; means driven by the prime mover for actuating the several conveyors; elevator and loaf pusher mechanism; a plurality of clutches respectively adapted to engage and release the several driving means; a plurality of timing cams provided with ratchet face rims; means actuated by the cams for engaging and releasing the clutches, and a plurality of eccentrics fitted with arms engaging the ratchet teeth of the respective cams, whereby the timing cams may be actuated to engage or release the clutches that the several conveyors, elevator and loaf pusher may function in proper sequence.

11. In a machine of the character described a horizontally movable vertically adjustable conveyor, an elevator fitted with a plurality of weighted tiltable flights adapted to receive and elevate leaves of bread to said conveyor, means carried by the conveyor adapted to tilt the elevator flights as they come successively in contact therewith through the operation of the elevator, whereby the loaves of bread may slide down the flights onto the conveyor, and means for limiting the tilting action of said flights.

In testimony whereof, I sign this specification.

ROBERT CURTIS RATHWELL.